(12) United States Patent
Zheng

(10) Patent No.: US 11,259,102 B2
(45) Date of Patent: Feb. 22, 2022

(54) LIQUID CRYSTAL DISPLAY MODULE, LIQUID CRYSTAL DISPLAY DEVICE, AND ELECTRONIC DEVICE

(71) Applicant: WUHAN CHINA STAR OPTOELECTRONICS TECHNOLOGY CO., LTD., Hubei (CN)

(72) Inventor: Yingbo Zheng, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 248 days.

(21) Appl. No.: 16/609,436

(22) PCT Filed: Mar. 21, 2019

(86) PCT No.: PCT/CN2019/078956
§ 371 (c)(1),
(2) Date: Oct. 29, 2019

(87) PCT Pub. No.: WO2020/118958
PCT Pub. Date: Jun. 18, 2020

(65) Prior Publication Data
US 2021/0337291 A1    Oct. 28, 2021

(30) Foreign Application Priority Data

Dec. 15, 2018 (CN) .......................... 201811537792.0

(51) Int. Cl.
*H04R 1/02*   (2006.01)
*G02F 1/1333* (2006.01)
(Continued)

(52) U.S. Cl.
CPC ....... *H04R 1/028* (2013.01); *G02F 1/133308* (2013.01); *G02F 1/133331* (2021.01);
(Continued)

(58) Field of Classification Search
CPC .......... H04R 1/028; H04R 1/345; H04R 3/00; H04R 2400/03; H04R 2499/11; H04R 2499/15; G02F 1/133331; G02F 1/133308
See application file for complete search history.

(56) References Cited

U.S. PATENT DOCUMENTS 9,223,136 B1   12/2015   Braun et al.
RE47,802 E    1/2020   Kang et al.
(Continued)

FOREIGN PATENT DOCUMENTS

CN    103869523 A    6/2014
CN    204650482 U    9/2015
(Continued)

*Primary Examiner* — Andrew L Sniezek

(57) ABSTRACT

A liquid crystal display (LCD) module, a liquid crystal display device, and an electronic device are disclosed. The LCD module includes a backlight module and an LCD panel. The LCD panel includes an upper substrate and a lower substrate disposed opposite to the upper substrate, and a liquid crystal unit filled between the upper substrate and the lower substrate. A reinforcing rib functioning as a sound wave conducting channel is disposed on a side of the backlight module facing away from the LCD panel. A vibration exciter is attached to the reinforcing rib for generating vibration energy.

12 Claims, 1 Drawing Sheet

(51) Int. Cl.
 *H04R 1/34* (2006.01)
 *H04R 3/00* (2006.01)
(52) U.S. Cl.
 CPC .............. *H04R 1/345* (2013.01); *H04R 3/00* (2013.01); *H04R 2400/03* (2013.01); *H04R 2499/11* (2013.01); *H04R 2499/15* (2013.01)

(56) References Cited

U.S. PATENT DOCUMENTS

2006/0098155 A1\* 5/2006 Choo ................ G02F 1/133351
 349/187
2017/0127166 A1\* 5/2017 Noma ...................... H04R 1/04
2021/0006744 A1\* 1/2021 Kim ..................... H04R 17/005

FOREIGN PATENT DOCUMENTS

CN 108124029 A 6/2018
CN 207625616 U 7/2018

\* cited by examiner

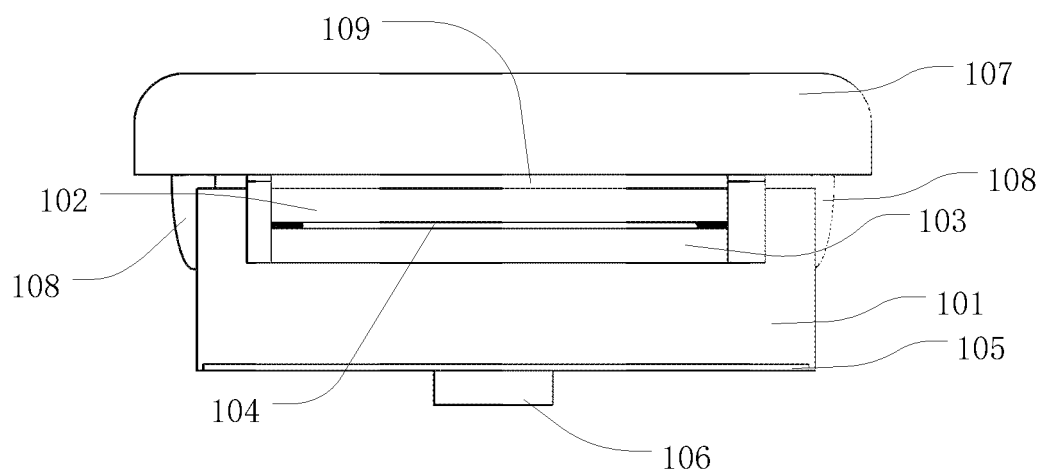

LIQUID CRYSTAL DISPLAY MODULE, LIQUID CRYSTAL DISPLAY DEVICE, AND ELECTRONIC DEVICE

BACKGROUND OF INVENTION

1. Field of Invention

The present invention relates to a semiconductor display field, and particularly, to a liquid crystal display module, a liquid crystal display device, and an electronic device.

2. Related Art

Since the introduction of full-screen mobile phones, screen ratios have been increasing every year. A main design idea of a whole mobile phone is to reduce the volume of each component of a light emitting diode (LCD) mobile phone, or to integrate components with an LCD screen. Under this design idea, some entire product factories canceled a call sound function at a top side of the mobile phone in the design, and use a method of "bone conduction" to cause vibration of a mobile phone body, so that sound waves are transmitted to a human face that touches the mobile phone, thereby to let an ear periosteum vibrate to hear the sound.

There are two main types of existing "bone conduction" technology. The first type is vibration of a mobile phone body caused by vibration of a frame of the mobile phone, for which a representative case is the "MI MIX" cantilever piezoelectric ceramic sounding scheme. The second type is sounds are made by attaching a vibration exciter to a back of a mobile phone screen to directly touch the vibration of a mobile phone screen, for which a representative case is the SHARP 305SH bone conduction sound and the VIVO NEX AAC exciter.

In the known second type of "bone conduction" technology implementation, the vibration exciter is currently attached to the back of the mobile phone screen, and is only suitable for an organic light-emitting diode (OLED) screen. The vibration exciter cannot be attached directly to a back of a conventional liquid crystal display (LCD), otherwise it will give rise to energy loss and timbre changes.

SUMMARY OF INVENTION

An embodiment of the present invention is to provide a liquid crystal display (LCD) module, a liquid crystal display device, and an electronic device, so that tone changes and volume loss resulting from vibration energy generated by the vibration exciter can be prevented from being affected by the LCD module, and disadvantages of the LCD module in sound wave transmission are thus removed, thereby providing a solution for the LCD module applied to a full-screen electronic device of the next generation.

To achieve the above-mentioned problems, in a first aspect, the present application provides a liquid crystal display module, comprising a backlight module and a liquid crystal display panel disposed on the backlight module, the LCD panel comprising an upper substrate and a lower substrate disposed opposite to the upper substrate, and a liquid crystal unit filled between the upper substrate and the lower substrate; wherein a reinforcing rib functioning as a sound wave conducting channel is disposed on a side of the backlight module facing away from the LCD panel, and a vibration exciter is attached to the reinforcing rib for generating vibration energy.

Further, the liquid crystal display module further comprises a cover disposed on the upper substrate, wherein the cover and the upper substrate are laminated with each other by optical glue, and the backlight module and the cover are rigidly connected by curing an edge sealant.

Further, the backlight module has four sides rigidly connected to the cover by a curing resin glue.

Further, an earpiece area for enabling a setting of an earpiece is formed on the cover, and the reinforcing rib is connected to the earpiece area of the cover.

Further, the backlight module has internal components fastened to a corresponding structure by a buckling structure.

Further, the backlight module has internal components protrudingly fixed to a corresponding structure.

Further, the upper substrate is a color filter substrate, and the lower substrate is a thin film transistor (TFT) substrate.

Further, each of the upper substrate and the lower substrate is a glass substrate, a tempered glass substrate, or a float glass cover.

Further, each of the upper substrate and the lower substrate is a rounded-corner rectangular substrate.

Further, each of the upper substrate and the lower substrate is a right-angled rectangular substrate.

In a second aspect, the present application provides a liquid crystal display (LCD) module, comprising a backlight module and an LCD panel disposed on the backlight module, the LCD panel comprising an upper substrate and a lower substrate disposed opposite to the upper substrate, and a liquid crystal unit filled between the upper substrate and the lower substrate; a reinforcing rib functioning as a sound wave conducting channel provided on a side of the backlight module facing away from the LCD panel, and a vibration exciter attached to the reinforcing rib for generating vibration energy; and an audio processing module and an audio signal driving circuit electrically connected to the vibration exciter, wherein the audio processing module is configured to output an analog audio signal to the audio driving circuit, and wherein the audio signal driving circuit is configured to drive the vibration exciter to generate the vibration energy after receiving the analog audio signal output by the audio processing module, and to trigger vibration of components of the LCD module attached to the vibration exciter, so that a sound signal is output through the LCD panel.

Further, the liquid crystal display module further comprises a cover disposed on the upper substrate, wherein the cover and the upper substrate are laminated with each other by optical glue, and the backlight module and the cover are rigidly connected by curing an edge sealant.

Further, the backlight module has four sides rigidly connected to the cover by a curing resin glue.

Further, an earpiece area for enabling a setting of an earpiece is formed on the cover, and the reinforcing rib is connected to the earpiece area of the cover.

Further, the backlight module has internal components fastened to a corresponding structure by a buckling structure.

Further, the backlight module has internal components protrudingly fixed to a corresponding structure.

Further, the upper substrate is a color filter substrate, and the lower substrate is a thin film transistor (TFT) substrate.

Further, each of the upper substrate and the lower substrate is a glass substrate, a tempered glass substrate, or a float glass cover.

Further, each of the upper substrate and the lower substrate is a rounded-corner rectangular substrate.

Further, each of the upper substrate and the lower substrate is a right-angled rectangular substrate.

In a third aspect, the present application provides an electronic device, comprising the liquid crystal display device of the second aspect.

The liquid crystal display module of the embodiment of the present invention comprises a backlight module and a liquid crystal display panel disposed on the backlight module, the LCD panel comprising an upper substrate and a lower substrate disposed opposite to the upper substrate, a liquid crystal unit filled between the upper substrate and the lower substrate, a reinforcing rib functioning as a sound wave conducting channel and disposed on a side of the backlight module facing away from the LCD panel, and a vibration exciter attached to the reinforcing rib for generating vibration energy. In the embodiment of the present invention, the reinforcing rib functioning as the sound wave conducting channel is disposed on the side of the backlight module facing away from the LCD panel, and the vibration exciter is attached to the reinforcing rib, so that tone changes and volume loss resulting from vibration energy generated by the vibration exciter can be prevented from being affected by the LCD module, and disadvantages of the LCD module in sound wave transmission are thus removed, thereby providing a solution for the LCD module applied to a full-screen electronic device of the next generation.

BRIEF DESCRIPTION OF DRAWINGS

To describe the technical solutions in the embodiments of the present invention, the following briefly introduces the accompanying drawings for describing the embodiments. Apparently, the accompanying drawings in the following description show merely some embodiments of the present invention, and a person skilled in the art may still derive other drawings from these accompanying drawings without creative efforts.

FIG. 1 is a schematic structural view of a liquid crystal display module in accordance with an embodiment of the present invention.

DESCRIPTION OF PREFERRED EMBODIMENTS

Hereafter, embodiments of the present invention will be described in detail with reference to the accompanying drawings. Apparently, the accompanying embodiments in the following description show merely some embodiments of the present invention, and a person skilled in the art may still derive other embodiments from these accompanying drawings without creative efforts.

In the description of the present invention, it is to be understood that the term "center", "longitudinal", "lateral", "length", "width", "thickness", "upper", "lower", "front", "rear", "left", "right", "vertical", "horizontal", "top", "bottom", "inner", "outer", "clockwise", "counterclockwise" and the like indicates orientation or the orientation or positional relationship based on the positional relationship shown in the drawings, for convenience of description only and the present invention is to simplify the description, but does not indicate or imply that the device or element referred to must have a particular orientation in a particular orientation construction and operation, and therefore not be construed as limiting the present invention. In addition, the terms "first", "second" are used to indicate or imply relative importance or the number of technical features specified implicitly indicated the purpose of description and should not be understood. Thus, there is defined "first", "second" features may be explicitly or implicitly including one or more of the features. In the description of the new practice, the meaning of "plurality" is at least two, e.g. two, three, etc., unless explicitly specifically limited.

Currently, to attach a vibration exciter to a back of a display screen so that vibration is transmitted through the display screen is only adopted to an organic light-emitting diode (OLED) display, but not a liquid crystal display (LCD). It is because components of an LCD's internal back light unit (BLU) are fixed to a display panel by a tape (compared to the OLED display), but the tape will greatly diminish transmission of vibration energy, causing that an energy loss of an LCD is 60% greater than that of an OLED under a same power condition of vibration exciters, so an effective volume heard through the LCD will be smaller (or power consumption of the LCD is greater under a same volume. At the same time, since optical films of multilayered (polyethylene terephthalate) PET substrates of an LCD have a certain difference in a sound wave absorption ratio for each frequency, a ratio of each band after the conduction of the multilayered material will be different, resulting in a change of tone and volume.

Accordingly, embodiments of the present invention are to provide a liquid crystal display module, a liquid crystal display device, and an electronic device, which are respectively described in detail below.

First, an embodiment of the present invention provides a liquid crystal display (LCD) module. The LCD module includes a backlight module and an LCD panel disposed on the backlight module. The LCD panel includes an upper substrate and a lower substrate disposed opposite to the upper substrate, and a liquid crystal unit is filled between the upper substrate and the lower substrate. A reinforcing rib functioning as a sound wave conducting channel is disposed on a side of the backlight module facing away from the LCD panel, and a vibration exciter is attached to the reinforcing rib for generating vibration energy.

As shown in FIG. 1, which is a schematic structural view of a liquid crystal display (LCD) module in accordance with an embodiment of the present invention, the LCD module includes a backlight module and an LCD panel disposed on the backlight module 101. The LCD panel includes an upper substrate 102 and a lower substrate 103 disposed opposite to the upper substrate 102, and a liquid crystal unit 104 is filled between the upper substrate 102 and the lower substrate 103, wherein both sides of the liquid crystal unit 104 can be sealed with a frame sealant (such as black portions on both sides of the liquid crystal unit in FIG. 1).

A reinforcing rib 105 is disposed on a side of the backlight module 101 facing away from the LCD panel to function as a sound wave conducting channel, and a vibration exciter 106 is attached to the reinforcing rib 105 for generating vibration energy.

In the embodiment of the present invention, the reinforcing rib 105 functioning as the sound wave conducting channel is disposed on the side of the backlight module 101 facing away from the LCD panel, and the vibration exciter 106 is attached to the reinforcing rib 105, so that tone changes and volume loss resulting from vibration energy generated by the vibration exciter 106 can be prevented from being affected by the LCD module, and disadvantages of the LCD module in sound wave transmission are thus removed, thereby providing a solution for the LCD module applied to a full-screen electronic device of the next generation.

On the basis of the above embodiment, in another preferred embodiment of the present application, as shown in FIG. 1, the LCD module further includes a cover (cover glass, CG) 107 disposed on the upper substrate 102. The cover 107 and the upper substrate 102 are laminated with each other by optical glue 109, and the backlight module 101 and the cover 107 are rigidly connected by curing an edge sealant. Furthermore, the backlight module 101 has four sides rigidly connected to the cover 107 by a curing resin glue 108. Therefore, the vibration energy of the vibration exciter 106 can be directly transmitted to a surface of the cover 107.

Based on the above embodiment, in another preferred embodiment of the present application, an earpiece area for enabling a setting of an earpiece is formed on the cover 107, and the reinforcing rib 105 is connected to the earpiece area of the cover 107, so that a path of sound wave conducting channel can be reduced, and a maximum amount of sound energy and original sound can be maintained.

Generally, the backlight module 101 includes a plurality of components. For example, the backlight module includes a light source, a light guide plate, a reflective plate, an optical film, and the like. Further, in order to avoid sound absorption effect of a plastic material of the backlight module, internal components (e.g., a light guide plate or a reflective plate) of the backlight module 101 can be fastened to a corresponding structure by a buckling structure, or can be protrudingly fixed to a corresponding structure.

A liquid crystal display panel is composed of a color filter (CF) substrate, a thin film transistor (TFT) array substrate, and a liquid crystal layer disposed between the CF substrate and the TFT substrate. The working principle of the liquid crystal display panel is to control rotations of liquid crystal molecules of the liquid crystal layer by applying a driving voltage on two glass substrates, and refract light of the backlight module to generate a picture. Therefore, in an embodiment of the present invention, the upper substrate 102 may be a CF substrate, and the lower substrate 103 may be a TFT substrate. Further, each of the upper substrate 102 and the lower substrate 103 may be a glass substrate, a tempered glass substrate, or a float thin glass cover.

Based on the above embodiment, in an embodiment of the present application, each of the upper substrate 102 and the lower substrate 103 is a rounded-corner rectangular substrate. In another embodiment of the present application, each of the upper substrate 102 and the lower substrate 103 is a right-angled rectangular substrate. A specific shape of the upper substrate 102 and the lower substrate 103 is not limited in the present application, and is specifically determined according to practical conditions.

Based on the above embodiment, in another preferable embodiment of the present application, the liquid crystal display is preferably a thin film field effect transistor liquid crystal display, which is manufactured at a lower cost than that of an organic light emitting display panel, and has advantages of better display performance, higher layering and color reproduction performance, and therefore a cost performance of a touch screen display using the thin film field effect transistor liquid crystal display is higher.

In order to better implement the LCD module in an embodiment of the present invention, based on the LCD module, an embodiment of the present invention further provides a liquid crystal display device, wherein the liquid crystal display device includes the LCD module according to any one of the LCD module described in the above embodiments. The liquid crystal display device further includes an audio processing module and an audio signal driving circuit electrically connected to the vibration exciter.

The audio processing module is configured to output an analog audio signal to the audio driving circuit. The audio signal driving circuit is configured to drive the vibration exciter to generate the vibration energy after receiving the analog audio signal output by the audio processing module, and to trigger vibration of components of the LCD module attached to the vibration exciter, so that a sound signal is output through the LCD panel.

In this embodiment, the audio processing module may receive an audio file output by a processor (not shown) to output an analog audio signal, and the audio file may be an audio file of various encoding formats, for example, MP3, WMA, WAV, ASF, AAC, etc.

The performance of the liquid crystal display device is further improved by employing the liquid crystal display module described in the above embodiments.

In order to better implement the liquid crystal display device in the embodiment of the present invention, based on the liquid crystal display device, the present invention further provides an electronic device, including the liquid crystal display device as described in the above embodiment of the liquid crystal display device.

Furthermore, the audio processing module in the liquid crystal display device may include: an audio codec and a digital to analog converter (DAC), wherein the audio codec is coupled to a processor of the electronic device and receives the audio file output by the processor and decodes the audio file into a digital audio signal. The DAC converts the digital audio signal into an analog audio signal, that is, an audio signal expressed in the form of current, voltage or charge.

After the audio signal driving circuit receives the analog audio signal output by the audio processing module, the analog signal carries an audio message and is processed into a current signal through a circuit on a printed circuit board (PCB) in the electronic device. At the same time, voice information is carried on the current signal, and the driving circuit transmits the current signal to the vibration exciter, so that the vibration exciter transmits a sound message through the vibration under a current action, drives electronic device components attached to the vibration exciter to vibrate together, and transmits the sound message to a cover in a liquid crystal display device, and is released through the cover to let a user hear the voice message.

Because the sound is transmitted to the cover at a front of the electronic device through the vibration exciter and electronic device components attached to the vibration exciter to be given out, there is no need to set a sound hole on the electronic device, so a front side of the electronic device does not need to reserve a position for the sound hole, so that an effective display area under a touch panel is not reduced for avoiding the position of the sound hole. As a result, the effective display area of the display panel below the touch panel can be increased in structural designing.

In the embodiment of the present invention, the electronic device may be a smart phone, a tablet device, a wearable device, or the like, which is not limited.

In comparison with technical solutions provided by the related art, in the vibration exciter solution provided by the embodiment of the present invention, the vibration exciter is attached to the back of the LCD module of the electronic device, thereby preserving more display space on a front side of the electronic device, and increasing the effective display area of the electronic device and a screen ratio of the electronic device.

In the above embodiments, the description of each embodiment has its own emphasis. For a part that is not detailed in an embodiment, refer to the detailed description in the other embodiments above, and details are not described herein again.

In specific implementation, each of the above units or structures may be implemented as a separate entity, or may be implemented in any combination as the same or several entities. Specific implementation of the above various units or structures can be referred to the foregoing method embodiments, and details are not described herein again.

The specific implementation of the foregoing operations can be referred to the foregoing embodiments, and details are not described herein again.

The liquid crystal display module, the liquid crystal display device, and the electronic device provided above by the embodiments of the present invention are described in detail. The principles and embodiments of the present invention are described herein with reference to specific examples. The description of the above embodiments is only for the purpose of understanding the method of the present invention and the core idea thereof. Also, for those skilled in the art, in accordance with the idea of the present invention, there will be changes in specific embodiments and applications. Accordingly, the contents of the present specification should not be construed as limitations of the present invention.

What is claimed is:

1. A liquid crystal display (LCD) module, comprising:
a backlight module and an LCD panel disposed on the backlight module, the LCD panel comprising an upper substrate and a lower substrate disposed opposite to the upper substrate, and a liquid crystal unit filled between the upper substrate and the lower substrate;
wherein a reinforcing rib functioning as a sound wave conducting channel is disposed on a side of the backlight module facing away from the LCD panel, a vibration exciter is attached to the reinforcing rib for generating vibration energy, and a cover is disposed on the upper substrate; and
wherein the cover and the upper substrate are laminated with each other by optical glue, and the backlight module and the cover are rigidly connected by curing an edge sealant.

2. The LCD module of claim 1, wherein the backlight module has four sides rigidly connected to the cover by a curing resin glue.

3. The LCD module of claim 1, wherein the backlight module has internal components protrudingly fixed to a corresponding structure.

4. The LCD module of claim 1, wherein the upper substrate is a color filter substrate, and the lower substrate is a thin film transistor (TFT) substrate, or each of the upper substrate and the lower substrate is a glass substrate, a tempered glass substrate, or a float glass cover.

5. The LCD module of claim 1, wherein each of the upper substrate and the lower substrate is a right-angled rectangular substrate.

6. A liquid crystal display device, comprising:
a liquid crystal display (LCD) module comprising a backlight module and an LCD panel disposed on the backlight module, the LCD panel comprising an upper substrate and a lower substrate disposed opposite to the upper substrate, and a liquid crystal unit filled between the upper substrate and the lower substrate;
a reinforcing rib functioning as a sound wave conducting channel provided on a side of the backlight module facing away from the LCD panel, a vibration exciter attached to the reinforcing rib for generating vibration energy, and a cover disposed on the upper substrate; and
an audio processing module and an audio signal driving circuit electrically connected to the vibration exciter, wherein the audio processing module is configured to output an analog audio signal to the audio driving circuit and;
wherein the audio signal driving circuit is configured to drive the vibration exciter to generate the vibration energy after receiving the analog audio signal output by the audio processing module, and to trigger vibration of components of the LCD module attached to the vibration exciter, so that a sound signal is output through the LCD panel; and
wherein the cover and the upper substrate are laminated with each other by optical glue, and the backlight module and the cover are rigidly connected by curing an edge sealant.

7. The LCD device of claim 6, wherein the backlight module has four sides rigidly connected to the cover by a curing resin glue.

8. The LCD device of claim 6, wherein the backlight module has internal components protrudingly fixed to a corresponding structure.

9. The LCD device of claim 6, wherein the upper substrate is a color filter substrate, and the lower substrate is a thin film transistor (TFT) substrate.

10. The LCD device of claim 6, wherein each of the upper substrate and the lower substrate is a glass substrate, a tempered glass substrate, or a float glass cover.

11. The LCD device of claim 6, wherein each of the upper substrate and the lower substrate is a right-angled rectangular substrate.

12. An electronic device, comprising the liquid crystal display device of claim 6.

* * * * *